(No Model.) 4 Sheets—Sheet 2.
J. H. BROWN.
COMBINED HARROW AND CULTIVATOR.
No. 580,835. Patented Apr. 13, 1897.
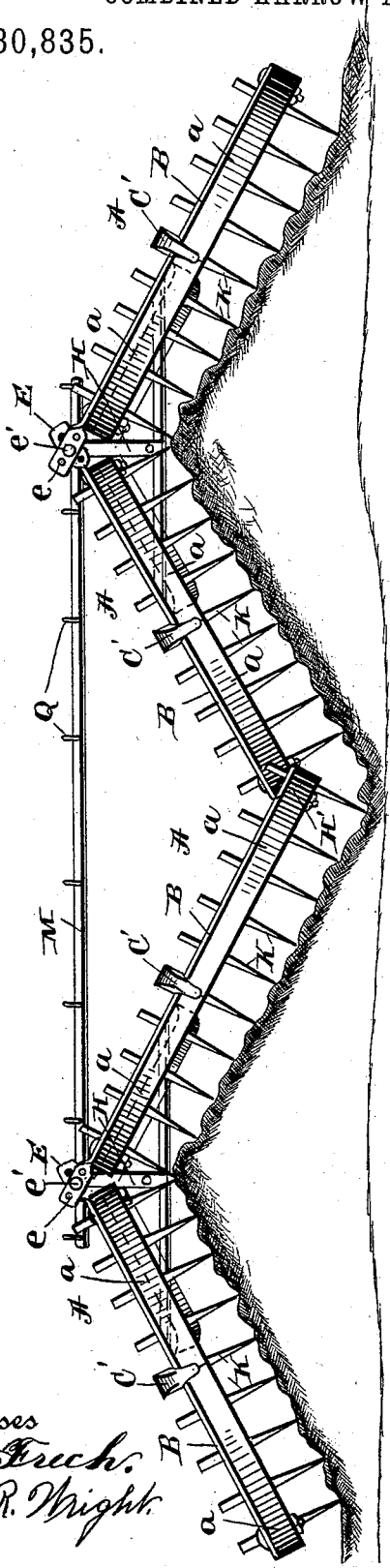
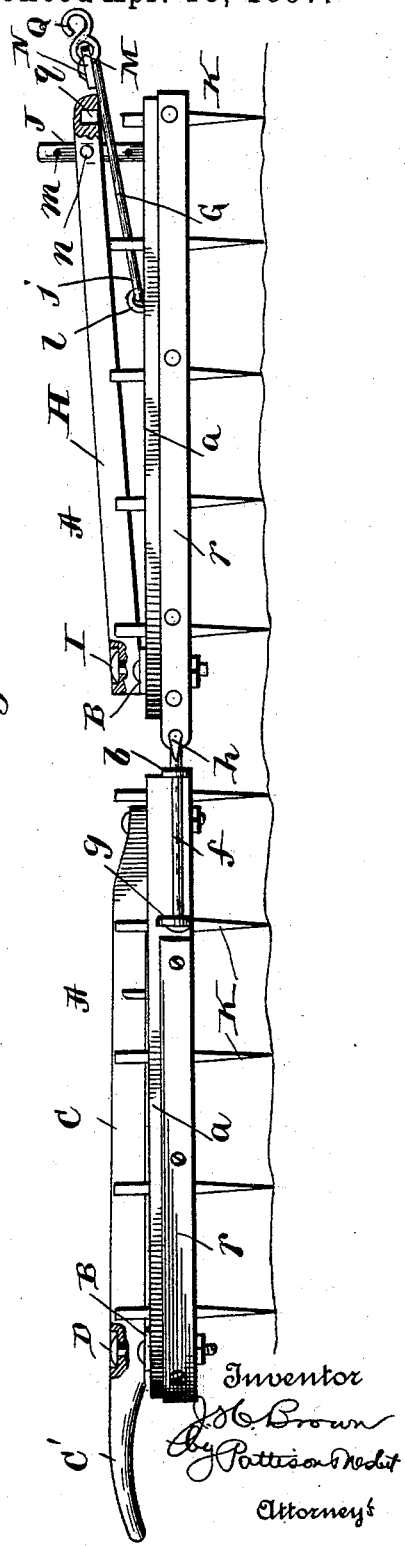

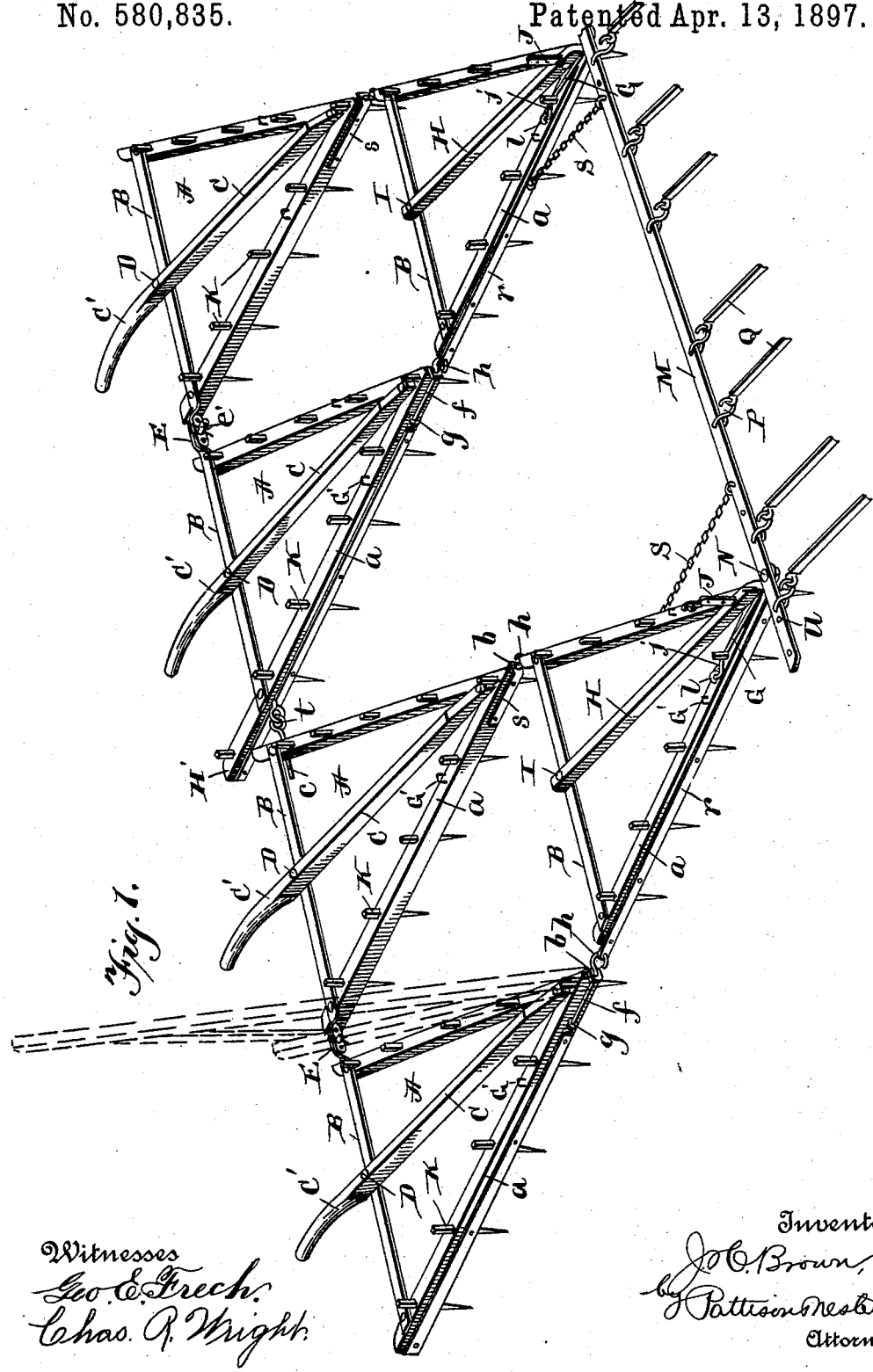

(No Model.) 4 Sheets—Sheet 3.
J. H. BROWN.
COMBINED HARROW AND CULTIVATOR.
No. 580,835. Patented Apr. 13, 1897.
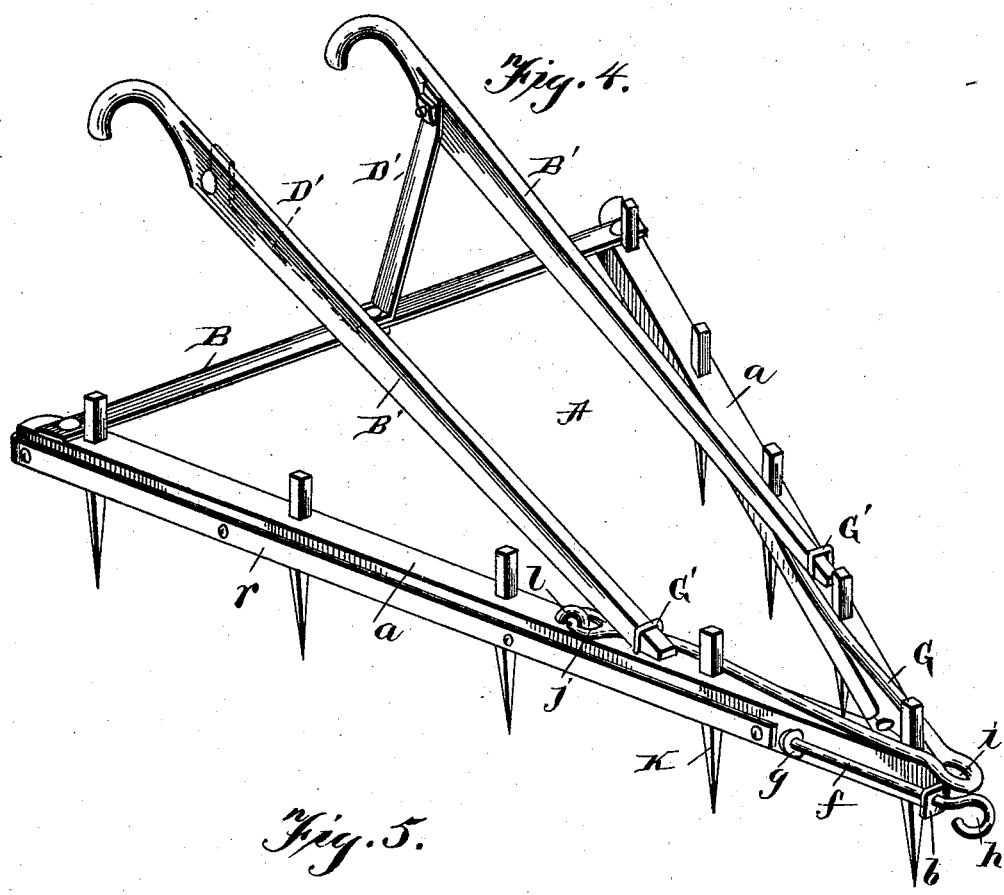
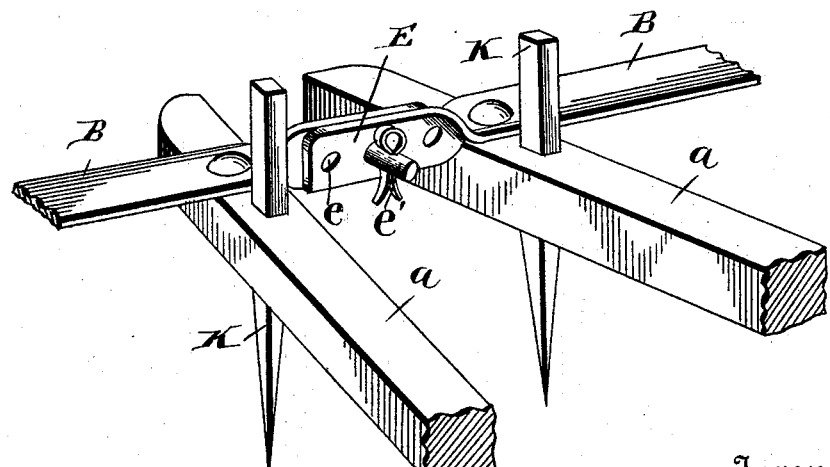
Witnesses
Geo. E. Fuch.
Chas. R. Wright.
Inventor
J. H. Brown,
by Pattison & Nesbit,
Attorneys (No Model.) 4 Sheets—Sheet 4.
J. H. BROWN.
COMBINED HARROW AND CULTIVATOR.
No. 580,835. Patented Apr. 13, 1897.
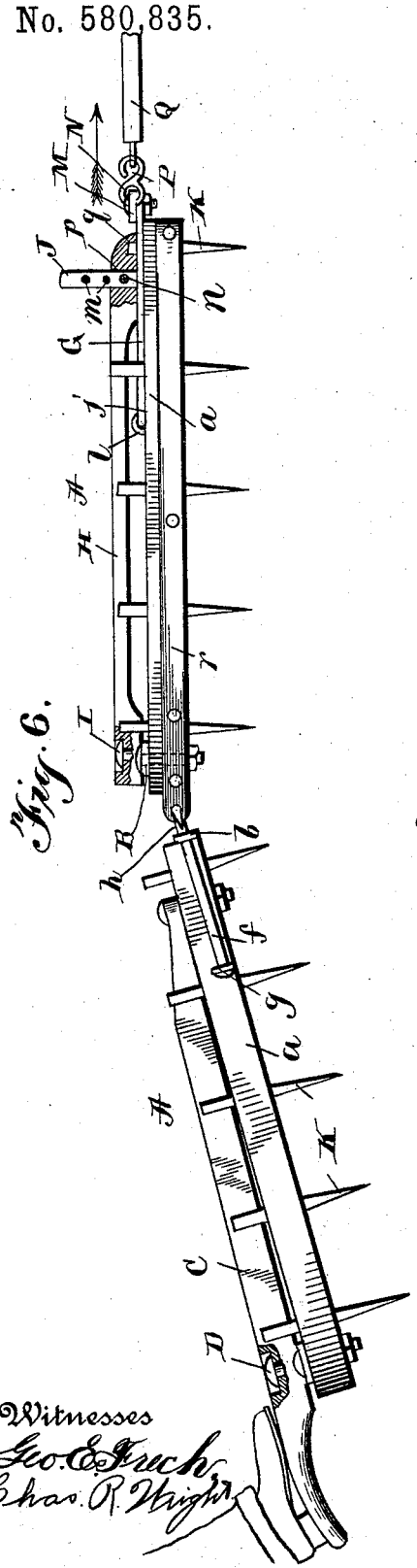
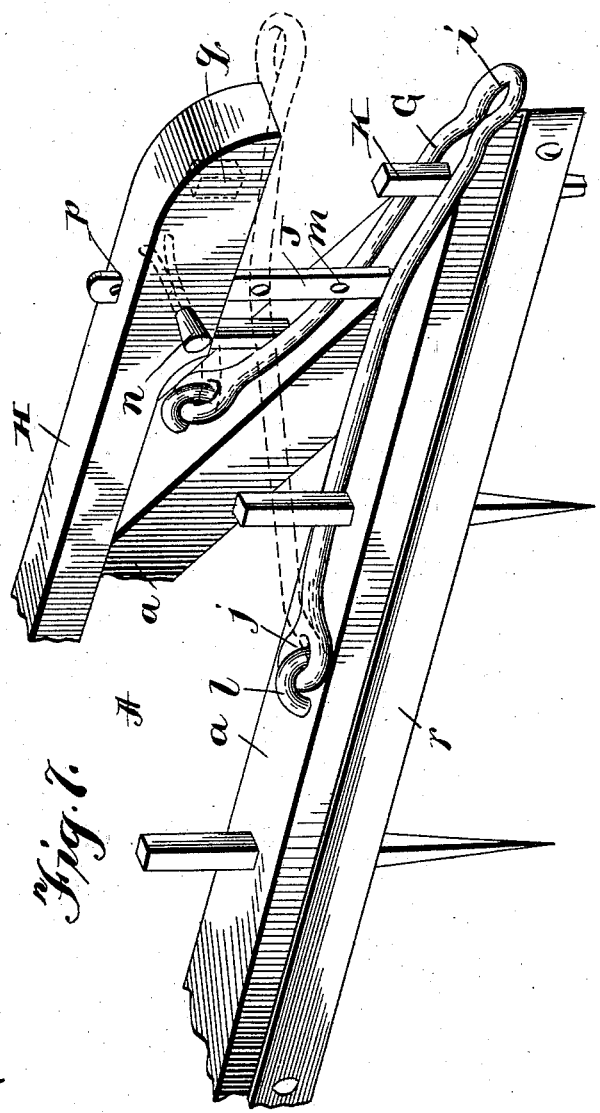
Witnesses
Geo. E. French
Chas. R. Wright
Inventor
J. H. Brown,
by Pattison Nesbit
Attorneys

UNITED STATES PATENT OFFICE.

JOHN H. BROWN, OF RURAL RETREAT, VIRGINIA.

COMBINED HARROW AND CULTIVATOR.

SPECIFICATION forming part of Letters Patent No. 580,835, dated April 13, 1897.

Application filed September 26, 1896. Serial No. 607,055. (No model.)

*To all whom it may concern:*

Be it known that I, JOHN H. BROWN, of Rural Retreat, in the county of Wythe and State of Virginia, have invented certain new and useful Improvements in a Combined Harrow and Cultivator; and I do hereby declare the following to be a full, clear, and exact description of the invention, such as will enable others skilled in the art to which it pertains to make and use it, reference being had to the accompanying drawings, which form part of this specification.

My invention relates to improvements in combined harrows and cultivators; and it consists in the construction and arrangement of the several harrows, as will be fully described hereinafter and particularly referred to in the claims.

The primary object of my invention is to combine a series of V-shaped harrows, six in number, whereby the combined arrangement produces a harrow or cultivator having in outline the shape of a W, which furnishes two front harrows for cultivating the tops of two ridges, and four harrows at the rear, which cultivate the sides of the two ridges of land, the harrows being flexibly connected together to automatically assume the shape of the ridge and to follow the inequalities of the land, the two front harrows connected by a draft-bar which holds them in their adjusted positions to suit the distance between the ridges.

Another object of my invention is to provide swiveled joints between the several harrows, which will permit them a free and independent movement within a limited distance, thus enabling the harrows to individually follow the inequalities of the ground being cultivated.

Another object of my invention is to so construct the harrows or cultivators at the rear of the machine that the operator may lift any one of the harrows or by stepping upon a rearwardly-extending arm or handle of one of the rear harrows cause the front harrow of the side section of the W to be lifted entirely from the ground and the front ends of the two rear harrows forming a side section of the W to be also lifted from the ground for the purpose of freeing the front harrow and the front portion of the rear harrows from the accumulated rubbish.

A further object of my present invention is to provide a specially-constructed adjustable draft for the front harrows, whereby the draft of the harrows can be readily and quickly regulated to cause their front ends to be lifted more or less by the draft of the animal, as may be desired for regulating the depth of cultivation at the will of the operator.

A further object of my invention is to provide adjustable connections for the rear ends of the two pairs of cultivators or harrows, whereby they may be spread apart or enabling them to more readily assume the shape and adapt themselves to the sides of ridges formed in the land, said adjustable connection being flexible for permitting the harrows to assume such shape as may be necessary to conform to the cross-sectional shape of the ridge or ridges being cultivated.

Another object of my present invention is to provide an adjustable connection for the rear ends of the two sections of the W and adjustable connections for the draft-bar at the front ends of the side sections, whereby the two sections of the W may be adjusted for widening or separating the sections to conform to the different distances between the ridges formed in cultivation. This is essential or desirable, for the reason that some farmers cultivate their land with ridges which, while practically a uniform distance apart, will be a greater distance apart than the ridges of their neighbors or those in a different locality, according to the necessity arising from the peculiar soil being cultivated or on account of the particular thing being cultivated.

Another object of my invention is to so connect all of the harrows forming the complete machine that they can be readily and quickly disconnected either to use the two side sections of the W as separate two-horse harrows or cultivators or to disconnect each of the cultivators and use them as single harrows or cultivators, as may be desired. In the latter case the harrows are each so constructed that a pair of handles can be attached and held in position by the same bolt which holds the single handles in position when the harrow is being used in series or as a gang-harrow.

Referring now to the drawings, Figure 1 is a perspective view of my harrow connected into a completed machine forming a W for the purpose to be hereinafter described. Fig. 2 is a rear end view of the harrow shown in Fig. 1, showing it operating upon two ridges. Fig. 3 is a side elevation showing the adjustable draft connection partly in section. Fig. 4 is a view of one of the harrows detached, showing the pair of handles connected for using the harrow as a one-horse harrow or cultivator. Fig. 5 is an enlarged perspective view of the adjacent rear ends of the two harrows which form the two side sections of the W. Fig. 6 is a side elevation of the harrow, showing the manner of automatically lifting the front harrows from the ground and the rear ends of the rear harrows of the side sections of the W by placing the foot upon a rearwardly-extending projection or handle of the rear harrow or harrows. Fig. 7 is an enlarged perspective view of the front end of one of the harrows, showing the adjustable draft connection.

Referring now to the drawings, A indicates a series of V-shaped harrows, consisting of the side bars $a$, in which the ordinary straight teeth are placed, as shown, or other forms of teeth may be used, if desired, without departing from the spirit of my invention. The front ends of these side bars of each harrow are connected in any suitable or convenient manner. The rear ends of the side bars $a$ are connected by the flat bars B, which have their ends bolted to the rear ends of the side bars, as clearly shown.

Especial attention is directed to the fact that the rear bars B are situated at a point above the side bars by being connected to their upper sides, whereby they are above the rubbish and trash and will not collect it, and also that these bars B are toothless, so that no rubbish is collected by a transversely-extending series of teeth, as is very common in the ordinary harrow.

By reference to Fig. 1 it will be seen that the outline of the combined harrows is in W form, the rear ends of the rear harrows being flexibly connected in a specific manner to be presently referred to, and the front ends of the rear harrows being flexibly swiveled to the rear ends of the front harrows.

The two front harrows are connected by a draft-bar M, which is provided with a series of hooks to which the traces of the animals are directly connected, doing away with the use of any single or double tree, which in either event is continually dragging upon the ground at the feet of the animal and is very objectionable for many reasons well known to the user of harrows which necessitate the use of single or double trees. The draft-bar M has an additional connection with the front harrows through the medium of the draft-chain S, connected to the draft-bar M at points between the harrows, the rear end of the draft-chain S being connected to the inner sides of the harrows intermediate their ends. This arrangement tends to equalize the draft and to brace the draft-bar M against swinging under the draft necessary to draw the whole series of harrows or cultivators.

The rear harrows are provided with the bars B, which have their rear ends extending beyond the rear ends of the harrows, to form projections adapted to receive the foot of the operator, for a purpose presently set forth, and to provide handles for lifting the harrow as may be desired. These arms, which are combined foot operating projections and handles, project above the upper ends of the teeth to form runners upon which the harrows may be transported by turning them upside down, as is understood by those skilled in the art.

When the harrow is in use, as shown in Fig. 1, and it is desired to clear the harrows of accumulated rubbish, it is only necessary for the operator to put his foot quickly upon one of the projections C' at the rear of one of the rear harrows or cultivators, as shown in Fig. 6, which will cause the lifting of the front harrows entirely from the ground and the lifting of the front ends of the rear harrows, as shown also in Fig. 6, through the draft of the animals in the direction shown in the same figure. The front ends of the rear harrows being connected to the rear ends of the front harrows against vertical independent movements, the pressure of the foot upon the foot extensions C' will tend to lift the rear ends of the front harrows, and this, assisted by the draft of the animal and the catching of the rear cultivators in the ground, causing a momentary stop of the harrow, will cause the harrows to assume the position shown in Fig. 6, thus relieving them of the accumulated debris or rubbish. The rear portions of the rear harrows are readily cleared of the rubbish by using the foot extension C' as handles for lifting the two central harrows of the series and by turning the rear side harrows of the series inward, as shown in dotted lines in Fig. 1.

In connecting the series of harrows of the form here shown it is necessary to their practical operation to have a swiveled connection, which I provide through the means of the swiveled irons $f$, having their front ends formed into hooks $h$, adapted to engage the rearwardly-extending ends of the plate $r$ at the side of the front harrows, as clearly shown. These swiveled rods $f$ are supported at their forward ends by means of the extending ends $b$ of the plate $s$ at the opposite side of the harrow from the rods $f$ and by means of staples $g$ at their rear ends, the rear ends of the rods $f$ being headed, as shown, to receive the draft. By means of this construction when the harrows assume the position shown in Fig. 2 for operating upon the sides of ridges there is practically no frictional or torsional resistance to them in assuming the position necessary to conform to the shape of the land being cultivated. The swiveled rods $f$ readily turn, allowing them to automatically and readily assume the proper positions; also, in lifting the rear side harrows in turning them inward for any purpose, as, for instance, passing a tree or high stump or for the purpose of cleaning the said harrows.

It is desirable in a harrow arranged as shown in Fig. 1 to have the connections between the two side sections which form the W capable of adjustment to widen or narrow the distance between them, while at the same time the rear connection for the two sections must be flexible in all directions—that is, practically a universal joint must be provided in order that the two sections at the rear will readily and automatically conform to the shape of the ridge being cultivated. It is also essential that the connection to the front ends of the front harrows of the two side sections should be rigid, so that the harrows will be held by this connection in a horizontal position for cultivating the tops of the ridges, while the rear harrows forming the rear section will have a universal-joint connection with the rear ends of the front harrows to permit them to conform automatically and without friction or torsional strain to the irregularities of the ground being cultivated or to the shape of the ridges being operated upon. This is accomplished by providing the flat draft-bar M with a series of openings $u$, through which the connecting-bolt N to the draft attachment (to be described hereinafter) passes, and by means of which the front harrows can be adjusted back and forth in relation to each other to vary the distance between their front ends, as may be desired. The back adjustment of the two sections is accomplished through the medium of two bolts $c$, which pass through the rear ends of the side bars $a$ of the two inner rear harrows, the bolts having interlocking eyes $t$, as shown, and their rear ends elongated through the sides of the harrows and provided with nuts, as shown, whereby the rear ends of the harrows at this point are capable of adjustment to increase or decrease the distance between them.

From this description it will be seen that the two front harrows of the side sections which form the W are held in a horizontal position to till or cultivate the top of the ridge, while the four rear harrows of the sections are permitted free independent movements in relation to each other and in relation to the front harrows upon the universal joints described for conforming to the shape and inequalities of the ground being acted upon.

It is also desirable to furnish an adjustment between the two rear harrows of the two sections of the W independent of the adjustment between the rear ends of the two sections themselves, and this is accomplished by extending the bars B of the rear harrows inward, as at E, and elongating the ends, as shown clearly in Fig. 5, and providing them with a series of openings $e$, through which a key $e'$ is passed. By this construction the rear ends of the harrows are flexibly connected to permit them to assume an angle in relation to each other as clearly shown in Fig. 2, while at the same time the distance between their rear ends can be increased or diminished, as the circumstances may make desirable. The bars B have their extended or elongated ends twisted into a vertical position, as also shown clearly in Fig. 5, whereby a horizontal pivotal point is formed through the medium of the pins $e'$, thus permitting the harrows to assume the positions heretofore described, and clearly shown in the drawings.

It is also very desirable to provide an adjustable draft attachment whereby the front harrows may either be permitted to oscillate vertically at their ends independent of the draft and also by means of which the depth of draft can be readily regulated. This I accomplish by means of the essentially V-shaped draft-bars G, having their rear ends flexibly connected to the front harrows at a point distant from their front ends through the medium of the staples $l$, which pass through the eyes $j$ at the inner ends of the draft-bar G, being connected to the front harrows intermediate their ends, as clearly shown. The draft-bar G, if unlimited, will permit the front ends of the harrow to follow the inequalities or unevenness of the ground by the movement of the draft-bar or front end of the harrow, as shown in dotted lines in Fig. 7. It is sometimes desirable to have the draft directly at the point of the front harrows, and this is accomplished by the means to be now described.

Each of the front harrows has the central longitudinally-extending bar H, connected at their rear ends to the cross-bars B through the medium of the detachable bolts I. The front ends of the harrows are provided with standards J, having a series of transverse perforations $m$, adapted to receive a key $n$. The front ends of the bars H are provided with vertical openings $b'$, through which the standard J passes, and with the transverse opening registering with the openings $m$ of the standards J, through which the key $n$ passes for the purpose of holding the front ends of the arms H in the desired vertical adjustment in relation to the front ends of the harrows and the draft-bars G. By carrying the front ends of the bars H down upon the draft-bars G, as shown in Fig. 1, the draft upon the front ends of the harrows will be directly at their front extremities. By adjusting the front ends of the bars H upon the standard J the front ends of the draft-bars G will be permitted more or less vertical oscillation, transferring the draft-point to the staples $l$, and the amount of independent vertical movement allowed the draft-bars G will regulate the amount of vertical oscillation or vibration which the front ends of the front harrows shall have independent of the draft. This is very desirable and is accomplished in a simple manner by the construction just described. The front ends of the bars H are provided with vertical recesses or openings $q$ to receive the projecting ends of the front teeth K of the front harrows, as is clearly illustrated in the drawings.

It is also desirable to have a series or gang cultivator or harrow so constructed that each harrow can be independently operated, thus converting the series into simply one-horse harrows, and this I accomplish in the following manner:

The hooks $h$ of the rear harrows are detached from the front harrows, and the connections at the rear ends of the rear harrows are disconnected. This then leaves each harrow a separate and independent harrow or cultivator. The arm H of the front harrows and the bars C of the rear harrows are detached, and the double handles B' are connected to the harrow or harrows desired to be used. Each harrow is provided with the two loops or staples G' near their front ends, and the front ends of the handles B' are shaped to enter these loops, as clearly shown in Fig. 4. The rear ends of the handles B' are connected by a U-shaped connection D', having an intermediate opening. By this construction the opening in the U-shaped connection D' registers with the opening in the rear bars B of each harrow, thus adapting by the construction shown and described the harrows to be used in series or singly simply by detaching the bars H or C, as the case may be, and connecting the handles B'.

I am aware that it is not novel to connect handles in a similar manner to that shown in Fig. 4, but, so far as I am aware, it is novel to provide a series of harrows V-shaped in form with constructions when used in series adapted without any variations to receive handles adapting each harrow to be used as a single-horse harrow.

If desired, the connections C at the rear ends of the two side sections of the W may be detached and the draft-bar M removed, which will convert the two sections into two two-horse harrows or cultivators. So, also, another set of three harrows may be connected in the same manner as the two sections shown in Fig. 1, converting the harrow into a six-horse harrow, so that instead of cultivating two ridges three ridges would be cultivated at each crossing of the field.

The whole harrow is so constructed and arranged that it may be handled by a single person, thus greatly reducing the cost of cultivation as compared to harrows which require several persons to manage them or as compared to the use of two or more harrows to accomplish what I accomplish by a single harrow and one man.

It will also be noticed that one of the inner rear harrows is provided with an extended end H', carrying a tooth, as clearly shown in Fig. 1, the same tooth being thus situated to cover or cultivate the space between the two inner rear harrows, as will be readily understood.

From the above description and drawings it will be noticed that I have produced a harrow in which the four rear harrows are flexibly connected to the front harrows, so that they have a free and independent movement in respect to each other and in respect to the front harrows, while at the same time the front harrows are held in a horizontal position, so that they will not jump about upon the top of the ridges being cultivated, as would otherwise be the case. The whole arrangement is simple and cheap to produce, while at the same time it effects a most desirable and efficient cultivator or harrow, owing to its adaptability to different kinds of cultivation or forms of ground being cultivated and owing to its being adapted to be detached and converted into either two or one horse harrows without additional expense, and so simple that any farm-hand can accomplish it.

In some instances it is desirable to rigidly connect the two harrows of the rear sections to prevent them from having any independent movement, and this is readily accomplished in the construction shown by me by inserting two bolts in the adjustable connections shown in Fig. 5. The openings which afford the adjustment are made so that they will register, and in this way two bolts $e'$ may be passed through two of the openings, which will make the harrows rigid. This rigid connection often serves a very desirable purpose, as, for instance, in very rough land where extra weight is needed. The harrows being firmly connected against flexible movement, it will be seen that more weight is added and rough ground more thoroughly pulverized.

The construction shown also enables me to detach the front harrows and place a connecting-bar across the front ends of the rear harrows similar to the bar M, which produces a four-horse harrow. This will enable me to cultivate ridges or flat culture after the crop is too far advanced to permit the front sections (which cultivate only the top of the ridges) being used on account of injuring the crop.

Having thus described my invention, what I claim, and desire to secure by Letters Patent, is—

1. A combined harrow and cultivator consisting of six V-shaped harrows connected to form in outline a W, universal connections uniting the front ends of the rear harrows and the rear ends of the front harrows, flexible connections uniting the rear ends of the rear harrows, for the purpose described, and a draft-bar spanning the space between the front harrows and firmly connected to the front ends of said front harrows to hold them in a horizontal position for the purpose described, substantially as described.

2. A combined harrow and cultivator consisting of six V-shaped harrows connected to form in outline a W, a connection between the front and rear harrows consisting of a rod having one end supported in a journal extending longitudinal the harrow, and its opposite end provided with an eye connected with the adjacent harrow, said longitudinal journal permitting the harrows an oscillation on a longitudinal axis, and the eye permitting the opposite ends of the harrows an up-and-down movement, substantially as described.

3. A harrow or cultivator consisting of a series of harrows flexibly connected, each harrow in the series having a detachable longitudinal central bar with a rear end central connection, and loops near the front end of their side bars in combination with two handles connected at their rear ends by depending U-shaped connections with a central opening registering with the central opening at the rear end of the harrow, the front ends of the handles adapted to enter the loops and the central opening in the U-shaped connection of the two handles registering with the central openings in the harrows for the longitudinal handles when in series, whereby the harrows are adapted to be used in series as described or as one-horse harrows, substantially as described.

In testimony whereof I affix my signature in presence of two witnesses.

JOHN H. BROWN.

Witnesses:
C. W. DAVIS,
JNO. B. STUART.